ANNULAR HOLE CUTTER

Original Filed Dec. 29, 1971 5 Sheets-Sheet 1

INVENTOR.
EVERETT D. HOUGEN
BY
Barnes, Kisselle, Raisch & Choate
ATTORNEYS

ANNULAR HOLE CUTTER

Original Filed Dec. 29, 1971 5 Sheets-Sheet 2

INVENTOR
EVERETT D. HOUGEN
BY
Barnes, Kisselle, Raisch & Choate
ATTORNEYS

ANNULAR HOLE CUTTER

Original Filed Dec. 29, 1971 5 Sheets-Sheet 3

INVENTOR.
EVERETT D. HOUGEN
BY
Barnes, Kisselle, Raisch & Choate
ATTORNEYS

INVENTOR.
EVERETT D. HOUGEN
BY
Barnes, Kisselle, Raisch & Choate
ATTORNEYS

ANNULAR HOLE CUTTER

Original Filed Dec. 29, 1971 5 Sheets-Sheet 5

INVENTOR.
EVERETT D. HOUGEN
BY
Barnes, Kisselle, Raisch & Choate
ATTORNEYS

United States Patent

Re. 28,416
Reissued May 6, 1975

28,416

ANNULAR HOLE CUTTER

Everett D. Hougen, Flushing, Mich.
(G-5072 Corunna Road, Flint, Mich. 48504)

Original No. 3,765,789, dated Oct. 16, 1973, Ser. No. 213,430, Dec. 29, 1971. Application for reissue Nov. 12, 1973, Ser. No. 414,927
Int. Cl. B23b *51/04*
U.S. Cl. 408—204 35 Claims

Matter enclosed in heavy brackets [ ] appears in the original patent but forms no part of this reissue specification; matter printed in italics indicates the additions made by reissue.

ABSTRACT OF THE DISCLOSURE

An annular hole cutter having a plurality of teeth spaced circumferentially around the lower end thereof. Each cutting edge has a radially inner portion and a radially outer portion. The two portions of the cutting edges are preferably spaced apart vertically and circumferentially and disposed such as to form positive side rake angles relative to the inner and outer peripheries of the cutter. Each tooth has associated therewith an inner gullet and an outer gullet designed to permit the free passage of chips upwardly away from the two portions of the cutting edges.

This invention relates to an annular hole cutter.

In order to obtain a smooth cutting action and a rapid feed rate with an annular hole cutter, particularly in metal, it is important that the chips cut are permitted to readily escape or be ejected from the zone of the cutting edges of the cutter teeth in an unimpeded manner without binding with each other and without binding against the walls of the hole being cut or the circular slug produced by the inner periphery of the cutter. In addition, it is important that the cutter teeth initiate the cutting action easily and penetrate through the material being cut at a high rate of speed without producing chattering and with the application of only moderate pressure and relatively low torque. From the standpoint of economy as well as the standpoint of an efficient cutting action it is further more important that the teeth of the cutter are wear resistant and capable of withstanding high impact forces without chipping or breaking.

It has been suggested heretofore to provide gullets or flutes around the outside of the side wall of an annular cutter to promote chip ejection. The use of relatively large front rake angles on the teeth has also been suggested as a means for producing a relatively high feed rate with only moderate pressure. However, the provision of gullets or flutes of sufficient radial depth to accommodate the chips being cut frequently weakens the side wall of the cutter and the use of relatively large front rake angles tends to produce grabbing of the cutter, particularly when used with hand-held drills, upon initiation of the cut and also when the cutter breaks through the bottom surface of the workpiece.

The main object of this invention is to provide an annular hole cutter which avoids the aforementioned difficulties and which at the same time possesses other important advantages from the standpoint of operation, cost, ease of manufacture and resistance to failure.

More specifically, it is an object of the present inventionto provide an annular hole cutter designed to cut smoothly and which has improved wear resistance, which is highly resistant to fracture and chipping and which is capable of producing accurately smooth finished holes with a relatively rapid feed rate.

A further object of the invention is to provide a tooth design on an annular hole cutter which imparts to the cutter the tendency to initiate a cut easily and smoothly and to be somewhat self-penetrating after the cut is initiated and, thus, impart stability to relatively unsupported cutter teeth. This enables holes to be cut accurately with light inexpensive equipment and fixturing.

The aforementioned objects are achieved in part by the specific design of the cutting edges of the cutter of the present invention and are also achieved in part by the design of the gullets or the flutes around the outer periphery of the cutter wall. The cutting edge of each tooth is preferably formed with a radially inner portion and a radially outer portion and these portions are disposed relative to one another so that the radially inner portion of the cutting edge defines a positive rake angle with the inner periphery of the cutter and the outer cutting edge portion defines a positive rake angle with the outer periphery of the cutter. Furthermore, the inner and outer cutting edge portions of each tooth are preferably disposed relative to one another so that each tooth cuts at least two separate chips or at least a chip which fractures easily in a lengthwise direction into two chips. In addition, the cutter of the present invention is formed with spiral gullets or flutes around the outer periphery thereof shaped to promote unobstructed ejection of the chips from the cutting zones of the teeth. Since the inner and outer edge portions of the cutting teeth ar preferably shaped and dimensioned to produce at least two chips, the gullets are sized to accommodate the chips from each tooth of the cutter without obstruction. The gullets are also shaped and sized to accommodate a single chip without undue obstruction. The geometry of the teeth and the gullets is also predetermined such that the chips cut are directed in a radially outwardly and axially upwardly direction into escape passageways defined by the gullets. Furthermore, the chips are directed away from the cutting edges smoothly and the chip or chips cut by one tooth do not become entangled with chips cut by another tooth in such a manner as to tend to clog the escape passages. The geometry of the gullets is such as to cause them to be self-clearing of chips.

The aforementioned objects are preferably also achieved in part by dividing the cutting edge of each tooth into a plurality of sections which are spaced apart vertically and staggered circumferentially. Each cutting edge section may have a relatively high rake face defining a gullet adjacent each section of the cutting edge, the gullets associated with each tooth preferably being of progressively increasing cross section in a radially outward and axially upward direction. However, directly adjacent the cutting edge of each section the front rake face may be inclined at a lesser rake angle than the angle of inclination of the gullet and each section of the cutting edge may furthermore be formed with a rake angle which varies in a radial direction.

Other objects and advantages of the present invention will become apparent from the accompanying drawings and description, in which.

Figure 4:
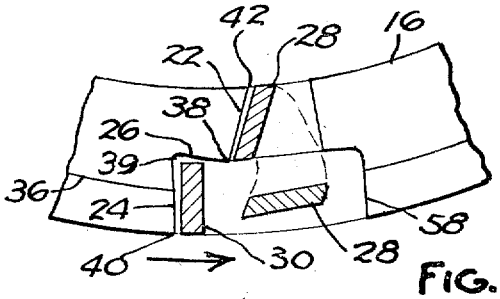
FIG. 4 is an enlarged fragmentary bottom view of the cutter showing the manner in which the chips are directed away from the cutting edges of each tooth and into the outer gullet.

Referring to FIGS. 1 through 5, the annular hole cutter of this invention is generally designated 10 and includes a cutter body 12 and an arbor 14. Cutter body 12 is of inverted cup shape having a side wall 16 and a top wall 18. The lower end of side wall 16 is formed with a plurality of regularly spaced cutting teeth 20. The inner and outer peripheral surfaces of side wall 16 are relieved in an upwardly direction at an angle of about ½°–¾° for clearance. Each cutting tooth 20 in the embodiment illustrated in FIGS. 1 through 5 is formed with a radially inner cutting edge 22 and a radially outer cutting edge 24. These cutting edges are shown in detail in FIGS. 4 and 5. As shown in FIG. 4, cutting edge 22 is spaced forwardly (in the direction of rotation as illustrated by the arrow) from cutting edge 24. These two cutting edges are separated circumferentially by a generally straight shoulder 26 which, as shown in FIG. 4, is inclined slightly in a radially inward direction so that the two cutting edges overlap radially a slight extent and thus have a tendency to cut two separate chips. The chip cut by edge 22 is designated 28 and the chip cut by edge 24 is designated 30. Whether the two cutting edges 22, 24 cut two chips or only a single chip depends upon the shape of shoulder 26, the extent to which these cutting edges are circumferentially offset and the rate of feed of the cutter. Even if cutting edges 22, 24 do overlap radially, the tendency for the cutter to cut a single chip increases as the circumferential offset of cutting edges 22, 24 decreases and as the rate of feed increases. This tendency is even more pronounced when the cutting edges do not overlap.

Figure 5:
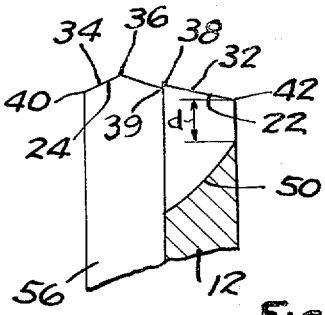
FIG. 5 is a fragmentary sectional view similar to FIG. 3 but on a larger scale.
Figure 6:
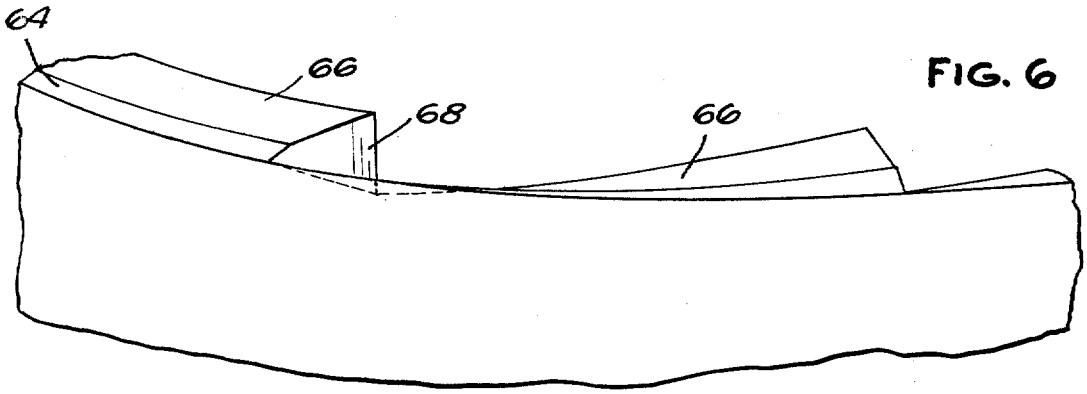
FIGS. 6 through 10 are fragmentary perspective views showing successive steps utilized in forming the cutting teeth and the gullets on a cutter according to this invention.
Figure 7:
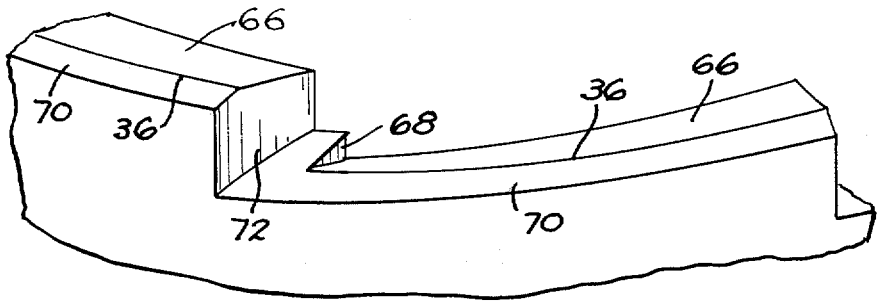
Figure 8:
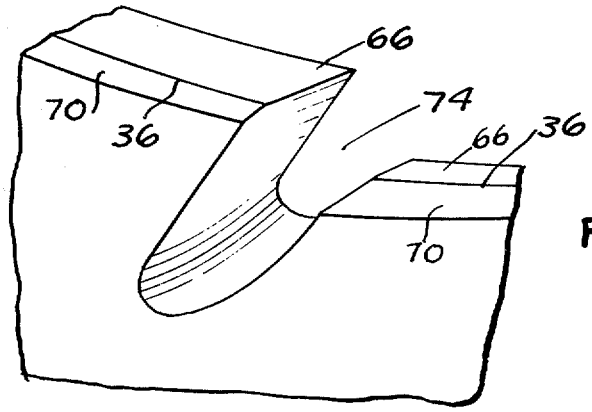

As shown in FIG. 5 the bottom face of each tooth is formed with two back off or clearance faces 32, 34. In the operative condition of the cutter back off face 32 inclines axially upward in a radially inward direction and back off face 34 inclines axially upward in a radially outward direction. In addition, each of these back off faces inclines upwardly from cutting edges 22, 24 in a circumferential direction a slight extent, say 5°–20°, to provide the necessary clearance. The two back off faces intersect in a crest 36 which in turn intersects the outer cutting edge 24. While the crest 36 is preferably located so that it intersects the outer cutting edge 24, if desired, the bottom face of each tooth can be shaped so that the crest 36 lies anywhere between the inner and outer periphery of the cutter side wall 12. The angles of inclination of back off faces 32, 34 in a radial direction are preferably determined such that the initial point of contact between the tooth and the work being cut is at the crest 36; that is, intersection of these two faces at the cutting edges. Thereafter, as the cutter penetrates the work, the outer end 38 of cutting edge 22 contacts the work followed subsequently by contact at the outer end 40 of cutting edge 24 and finally contact at the inner end 42 of cutting edge 22. In one form of cutter according to the present invention having a wall thickness of about 0.090 inch and having a configuration generally the same as that illustrated in FIGS. 4 and 5 very satisfactory results have been obtained in cutting holes in mild steel where point 38 was spaced above point 36 about 0.003–0.004 inch; point 40 was spaced above point 36 about 0.004–0.006 inch; and point 42 was spaced above point 36 about 0.012–0.015 inch. Cutting edges 22, 24 were staggered circumferentially from point 38 to point 39 about 0.025 inch.

Figure 1:
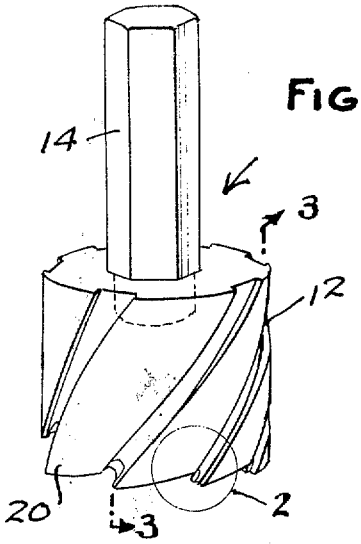
FIG. 1 is a perspective view of one form of cutter according to the present invention.
Figure 2:
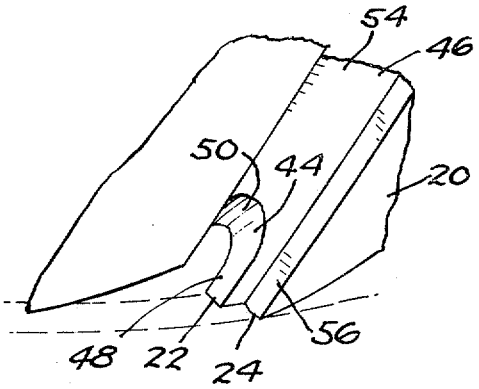
FIG. 2 is an enlarged fragmentary view of a portion of the cutter shown in FIG. 1 which is designated by the circle 2.
Figure 3:
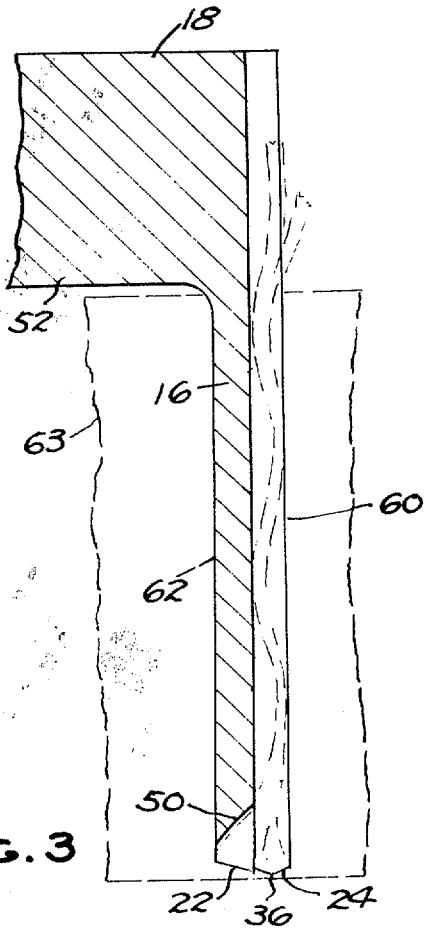
FIG. 3 is a fragmentary sectional view of the cutter along line 3—3 in FIG. 1.

As seen in FIGS. 1 and 2, the cutter is provided with a series of inner gullets 44 and outer gullets 46, one adjacent each tooth. Each inner gullet 44 adjacent cutting edge 22 is defined by a front rake face 48 which slopes upwardly and rearwardly relative to the direction of rotation of the cutter. The upper end of each inner gullet 44 is defined by a curved surface 50 which slopes inwardly in a radially outward direction as shown in FIG. 5. The angle of inclination of the inclined surface 50 is not critical but preferably lies in the range of about 45°–60° to the horizontal. Each outer gullet 46 is spirally inclined upwardly and rearwardly preferably at an angle of between 35°–45°. Each gullet 46 extends spirally upwardly around the outer periphery of side wall 12. Preferably the outer gullets 46 extend the full height of side wall 12 or at least to a level above the bottom face 52 of the top wall 18 of the cutter. This renders the outer gullets operative for the maximum depth to which the cutter is capable of penetrating. In the embodiment illustrated in FIGS. 1 through 5 the outer gullets 46 extend vertically the full height of side wall 16. In the cutter illustrated in FIG. 19 the outer gullets extend upwardly to about the level of the bottom face of the top wall of the cutter. In the embodiment illustrated in FIG. 15 the cutter is specifically designed for use in sheet metal, in which case it is only necessary that the gullets have a vertical extent greater than the thickness of the sheet metal being cut.

Each outer gullet 46 is defined by an inner circumferentially extending face 54 and generally parallel, radially extending faces 56, 58 (see FIGS. 2 and 4). As is clearly shown in FIG. 4, the radial depth of gullets 46 determines the length in a radial direction of inner cutting edge 22. For reasons pointed out hereinafter, the radial extent of cutting edge 22 is preferably approximately one-half or less the thickness of the cutter side wall 16. Thus, the depth of each gullet 46 is preferably at least one-half the thickness of the cutter side wall. The daylight height d (FIG. 4) of each inner gullet is preferably not greater than the radial depth of outer gullet 46, but it should in no event be greater than about 0.040 inch in a cutter for mild steel to prevent the inner gullet from clogging with chips.

The function of gullets 44, 46 is to provide an escape path for the chips cut by edges 22, 24. Thus, as shown in FIG. 4, chip 28 cut by edge 22 is directed in a radially outward direction by the inclination and disposition of edge 22 and by outwardly inclined surface 50 of the inner gullet into the outer gullet 46. Likewise, chip 30 cut by edge 24 lies within the outer gullet 46. Since the depth of gullet 46 in a radial direction is at least equal to the width of chips 28 and 30 and since the circumferential extent of each gullet 46 is at least and preferably greater than the thickness of the side wall 16, it is clear that each of the chips 28, 30 can be readily accommodated by outer gullet 46 as they are cut and curl upwardly in the escape path provided by gullet 46. In order to insure unimpeded flow of chips 28, 30 upwardly away from the cutting edges 22, 24, each outer gullet 46 has a circumferential extent preferably on the order of one and one-half times the thickness of wall 16. This enables each of the chips to curl upwardly away from the cutting edges without interfering or binding with one another. The manner in which the inner chip 28 is directed outwardly into outer gullet 46 by the upwardly and outwardly inclined surface 50 is illustrated in FIG. 4.

In order to prolong the life of cutting edges 22, 24 it is essential that chips 28, 30 are cut freely and any tendency for the chips to bind with or become wedged against the side wall 60 of the hole being cut and the side wall 62 of the center slug 63 being cut is eliminated. It is essential that a smooth cutting action be provided with these respective surfaces. Accordingly, the two gullets 44, 46 are formed in the cutter so that positive side rake angles are provided for both the inner cutting edges 22 and the outer cutting edges 24. Thus, the surface 56 of gullet 46 is inclined to the radial plane so that point 40 lies ahead of center and provides a positive side rake angle for cutting edge 24. Likewise, the face 48 of gullet 44 is inclined to the radial plane so as to provide cutting edge 22 with a positive side rake angle relative to center slug 63. These positive inner and outer side rake angles produce smooth cuts and eliminate the tendency for the chips to bind with the wall of the hole being formed and with the outer periphery of the center slug formed by the cutter. The positive side rake angle of edge 22 also assists in directing chip 28 in radially outward direction into gullet 46. The positive side rake angle of edge 24 also assists in directing chip 30 away from the side wall of the hole being cut and against shoulder 26.

In the arrangement shown in FIGS. 1 through 5 each cutting edge 22, 24 has a relatively large front rake angle which is determined by the rearward inclination of faces 48, 56. These relatively large front rake faces make for easy penetration of the cutter into the work being cut. However, in view of the fact that cutting edges 22, 24 are spaced apart vertically and tend to cut independently of one another, there is little tendency for the cutter to suddenly grab or dig into the workpiece when the cut is initiated. As soon as the teeth contact the workpiece, cutting edge 24 forms a shallow groove in the workpiece. But, before the cutter has a tendency to dig into the workpiece, the outer end 38 of cutting edge 22 which is spaced upwardly and forwardly of edge 24 encounters the top face of the workpiece and provides a sufficient braking action to minimize any tendency of the cutter to dig into the workpiece. Likewise, when the cutter point or crest 36 breaks through the bottom face of the workpiece the tendency for the cutter teeth to plunge through the workpiece is resisted by the braking effect of the raised and forwardly located cutting edge 22. Thus, a very clean hole is cut through the workpiece and there is little tendency to produce a large objectionable burr around the lower edge of the hole cut.

Figure 9:
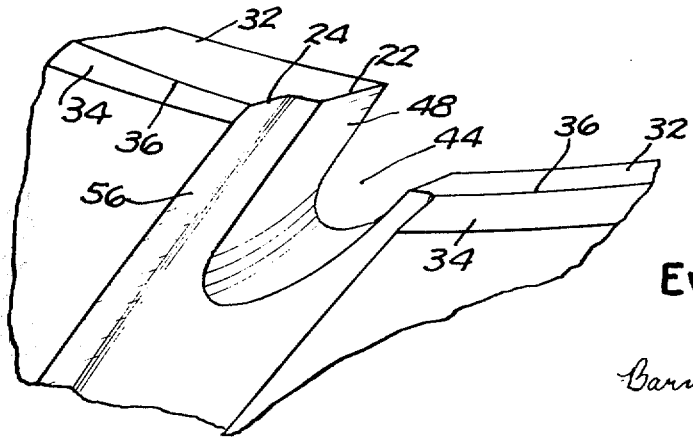

In FIGS. 6 through 10 there is illustrated a series of successive operations illustrating the relatively simple and economical manner in which a cutter according to the present invention can be formed. The cutter body is formed from a cylindrical cup-shaped blank having a flat annular end 64 opposite the top wall of the cup-shaped blank. In the first operation a suitable grinding wheel or cutter, such as a carbide burr or a small elongate end mill, is advanced into the cutter along an axis inclined to the cutter axis to machine around successive segments of end 64 inclined surfaces 66 each of which terminates in an axial shoulder 68. Each surface 66 is machined to provide the back off surface 32 when machining of the cutter is completed. Thereafter the blank is subjected to a second operation wherein a similar wheel or cutter is inclined oppositely to the wheel or cutter used in the first operation and a circumferential cut is made to provide a series of surfaces 70 each of which terminates in the shoulder face 72. Surface 70 is machined to form the back off surface 34 of the finished cutter and the intersection of surfaces 66 and 70 provides the crest 36 shown in FIGS. 4 and 5. Thereafter the side wall of the blank is machined or ground to form a radial groove 74 adjacent and cut into each shoulder 72. Slot 74 forms the inner gullet 44 of the finished cutter. The subsequent step involves the cutting of the outer gullet 46. This step is illustrated in FIG. 9 and is accomplished by means of an end mill, cutter, or grinding wheel that cuts into the outer side of the blank side wall and traverses a path which is of spiral configuration relative to the side wall of the blank. Each gullet 46 is preferably cut so that it becomes progressively wider and deeper in an upward direction.

Figure 10:
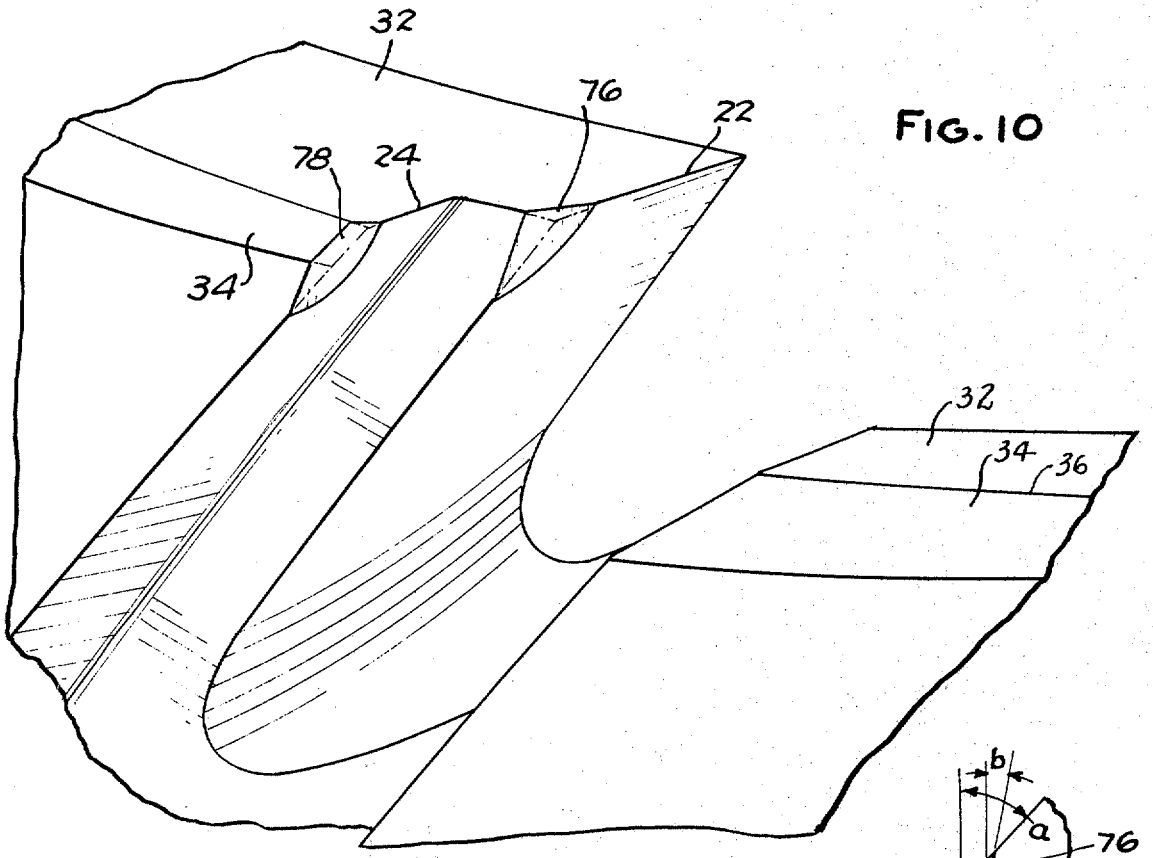
Figure 11:
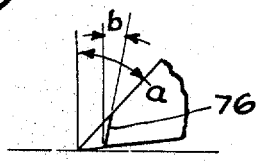
FIG. 11 is a somewhat diagrammatic view illustrating the manner in which a portion of each cutting edge may be provided with a front rake face having a rake angle which is relatively small.

The cutters utilized for cutting grooves 74 and outlet gullet 46 are shaped and positioned so that the trailing faces 48, 56 of these gullets define the front rake faces of cutting edges 22, 24. While these faces may have a rake angle as small as 20° and the rake angles need not be the same, as shown previously, faces 48, 56 are preferably generally parallel and inclined to the axis of the cutter at an angle of between 35°–45° in order to produce a free flow of the chips outwardly and in order to provide the cutter with good work penetration characteristics. However, depending upon the material being cut and the diameter of the hole cutter, it is possible that the outer ends 38 and 40 of cutting edges 22, 24, respectively, may be vulnerable to chipping and rapid wear. Thus, where desirable and as illustrated in FIG. 10, small flats 76, 78 can be ground on the outer corners 38, 40, respectively, so that the front rake at these portions of cutting edges 22, 24 can be substantially less than the front rake of the remaining portions of these cutting edges. The provision of the small front rake faces 76, 78 enlarge the included angle between the front rake face and the back off faces of these portions of the cutting edges. The enlargement of these included angles reduces the tendency for these corners to chip and also provides a better heat transfer away from the cutting edges to thus prolong the life thereof. Thus, while the major portion of the cutting edges 22, 24 may have a front rake angle of 35°–45°, the corners 38 and 40 of these cutting edges can have a much lesser rake angle as shown in FIG. 11. As an example, the rake angle for the major portion of cutting edge (designated a in FIG. 11) may be as high as 45° while the front rake angle at the flat 76 (designated b in FIG. 11) may be relatively small, for example, 20° or even zero. If desired, the flats 76, 78 may be extended entirely across cutting edges 22, 24. In any event, the positive side rake angles of edges 22, 24, which need not be the same, are sufficiently large as originally formed so that they remain positive even after flats 76, 78 are ground thereon.

Figure 12:
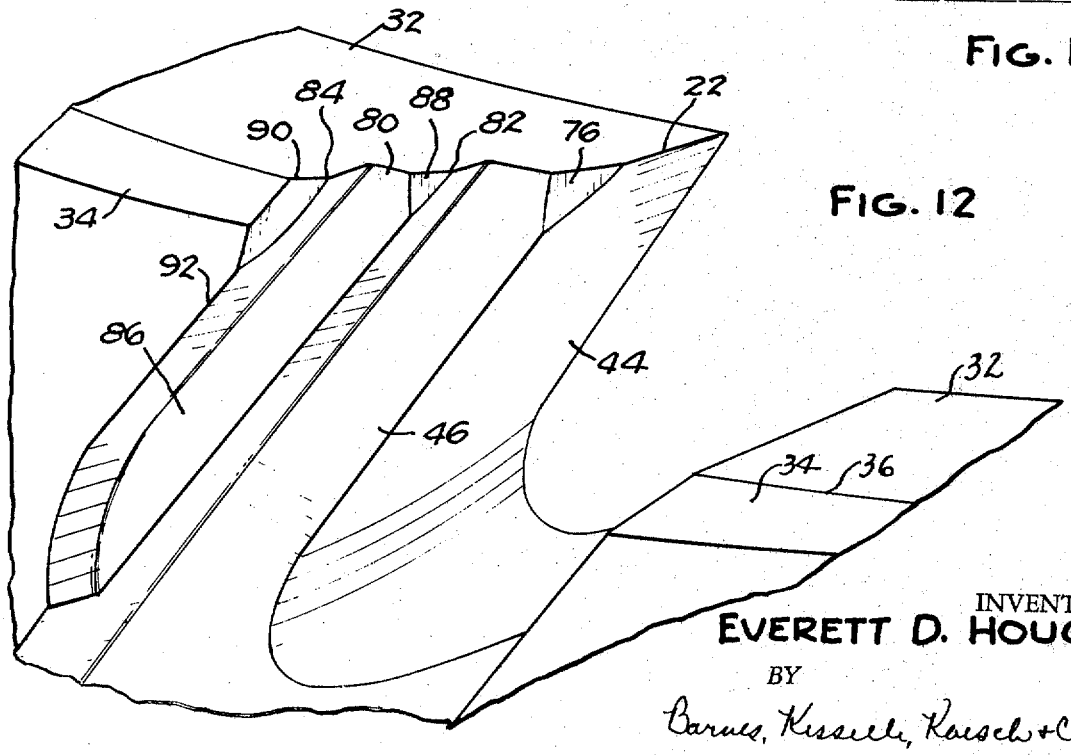
FIG. 12 is a fragmentary perspective view of a modified form of cutter in accordance with the present invention.

The cutter shown in FIG. 12 is very similar to that illustrated in FIGS. 1 through 5 except that the outer cutting edge is formed with an additional step or shoulder 80 so that in effect each tooth is provided with three cutting edges which are designated in FIG. 12 as 22, 82 and 84. When each tooth is provided with three or more cutting edges as illustrated in FIG. 12 small additional gullet 86 is formed on the outer periphery of the cutter to accommodate the chip cut by the outermost cutting edge 84 and direct it into gullet 46. However, gullet 46 remains of substantially the same size so that it can accommodate the chip of maximum width that is cut by cutting edge 22. If the outer ends of cutting edges 82, 84 are vulnerable to chipping, flats 88 and 90 can be ground thereon to provide these outer corners with substantially less rake than the rake provided by the trailing faces of gullets 44, 46 and 86. The trailing face of gullet 86 is designated 92.

Figures 13, 14:
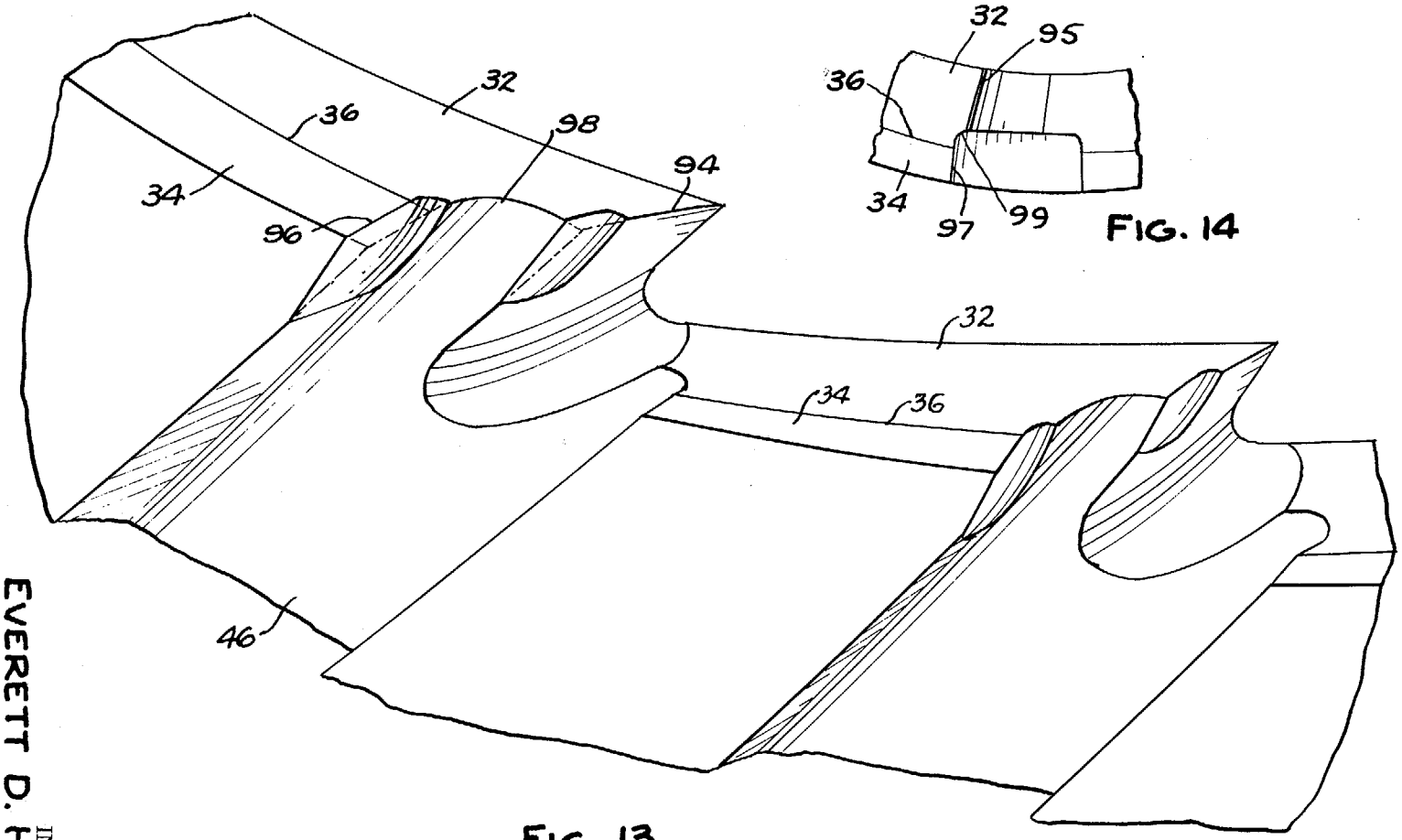
FIG. 13 is a view similar to FIG. 12 of another modified form of cutter according to the present invention.
FIG. 14 is a fragmentary bottom view of another form of cutter according to the present invention.

The tooth configuration shown in FIG. 13 differs only slightly from that shown in FIG. 4. In the arrangement shown in FIG. 13 the vertically offset inner cutting edge 94 and outer cutting edge 96 are staggered circumferentially and are connected by a curved shoulder 98. In other respects the tooth configuration shown in FIG. 13 is substantially the same as that shown in FIGS. 1 through 5. Where the two cutting edges are connected by a curved shoulder (such as illustrated at 98) there is a tendency for each tooth to cut a single chip rather than two separate chips. However, if cutting edge 96 is offset circumferentially sufficiently from cutting edge 94 and if the feed rate is not excessive, the portion of the chip cut by the curved cutting edge at 98 will be thin and fragile and the chip will automatically split lengthwise as it is being cut. Thus, the thickness of the chip and the extent to which the two cutting edges 94, 96 are offset circumferentially will determine whether a single chip or two separate chips will be cut. FIG. 13 also illustrates the fact that in order to obtain the desired circumferential extent of the outer gullet 46 with a predetermined circumferential offset between cutting edges 94, 96, the leading side 58 of each gullet can be located forwardly of the leading face of inner gullet 44.

FIG. 14 illustrates a tooth design wherein the two cutting edges 95, 97 are not in reality staggered circumferentially. The rounded shoulder 99 necessarily results from the fact that the trailing faces of inner gullet 44 and outer gullet 46 are inclined relative to one another so that edge 95 will have a positive side rake angle with respect to the inner periphery of the cutter and edge 97 will have a positive side rake angle with respect to the outer periphery of the cutter. The cutter shown in FIG. 14 will produce a single chip at each tooth which will have a width which corresponds generally with the thickness of the cutter side wall. However, outer gullet 46 has a circumferential extent greater than the thickness of the cutter side wall so that the chip produced will be directed upwardly through gullet 46 in a generally flattened condition. Likewise, even though a single chip is cut by each tooth, the cutter will cut smoothly without binding because of the positive side rake angles around the inner and outer peripheries of the cutter side wall.

Figure 15:
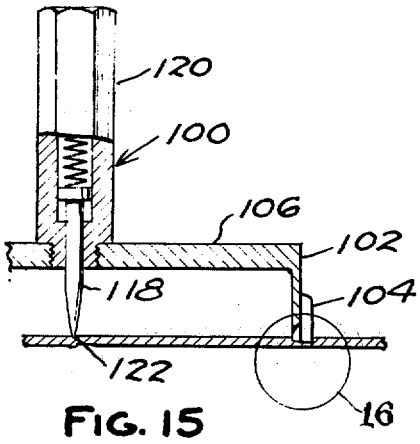
FIG. 15 is a fragmentary vertical sectional view of another form of cutter in accordance with the present invention.
Figure 16:
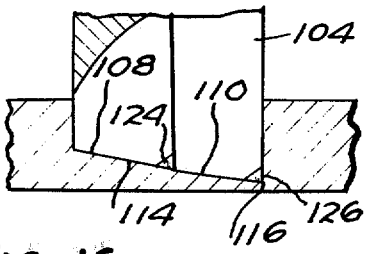
FIG. 16 is an enlarged fragmentary sectional view of the circled portion of FIG. 15 which is designated 16.
Figure 17:
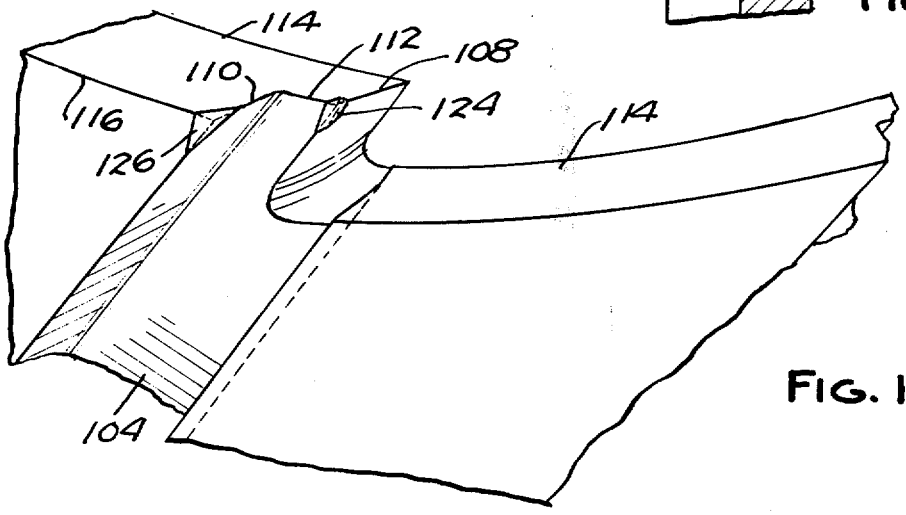
FIG. 17 is an enlarged fragmentary perspective view of the cutter shown in FIGS. 15 and 16.

FIGS. 15 through 17 illustrate one form of cutter 100 according to the present invention which is specifically designed for cutting relatively thin material, such as sheet metal. As pointed out previously, since the material being cut is relatively thin in relation to the vertical dimension of the cutter body 102, the outer gullets 104 may terminate at their upper ends below the level of the top wall 106 of the cutter body. However, the cutter shown in FIGS. 15 through 17 could be utilized for cutting thicker material if gullets 104 are extended to at least the level of the top wall 106 of the cutter. In cutter 100 the inner and outer cutting edges (designated 108, 110, respectively) are circumferentially staggered and connected by a circumferentially extending, generally straight shoulder 112 as previously described. However, the single back off face 114 on this cutter slopes upwardly in a radially inward direction from the inner to the outer periphery of the cutter. Thus, the crest 116 of each cutting tooth lies at the outer periphery of the cutter side wall. However, since the two cutting edges 108, 110 are vertically offset and circumferentially spaced and, thus, cut independently of each other, the tendency of the cutter to grab upon initiation of the cut and upon breaking through the bottom side of the workpiece is likewise reduced to a minimum. This is particularly important in the case of cutters mounted in a hand-held power tool where rigidity and perfect alignment between the cutter and the workpiece are difficult to maintain. This cutter is particularly suitable for cutting very thin material, such as shim stock, since the hole is completely cut as soon as the crests 116 penetrate through the material.

It will be appreciated that in view of the inclination of back off face 114 in a circumferential direction, depending upon the extent of circumferential offset between cutting edge 108 and 110 and the size of the positive side rake angle of outer cutting edge 110, the outer end of inner cutting edge 108 (the flat 124) may be disposed in a higher plane than the inner end of outer cutting edge 110. Likewise, in the cutter shown in FIG. 14 even though cutting edge portions 95, 97 are not truly staggered in a circumferential direction, this positive side rake angle of portion 97 may be sufficiently large so that the outer end of edge portion 95 may be lower than the adjacent rounded portion 99 on the outer cutting edge portion 97. In relation to the cutter shown in FIGS. 1 through 5, this effect is illustrated in FIG. 5 wherein it will be noted that point 38 at the outer end of inner cutting edge 22, in the operative position of the cutter, is located in a lower plane than point 39 at the inner end of the outer cutting edge 24. This vertical offset of the low point in the inner cutting edge relative to the adjacent portion of the outer cutting edge contributes substantially to the ability of the cutter to overcome the tendency to grab upon the initiation of the cut and upon breaking through the lower face of the workpiece being cut.

Experience has shown that where the cutter is used with a hand-held power tool, in order to prevent the cutter from skidding across the work when the cut is initiated, it is merely necessary to utilize a retractable, spring biased pilot member 118 within the arbor 120 of the cutter. Pilot 118 is ground to a sharp point so that it will hold a center position when pressed into the surface being cut. If desired, the surface may be prick punched as at 122. The tendency for the cutter to grab or skip over the surface of the workpiece is reduced to such an extent by the stepped tooth design disclosed herein that the need for a center pilot drill (even in the case of a hand-held power tool) is entirely eliminated. Where the tool is mounted in a rigid arbor of a machine tool it is not even necessary to employ the spring-pressed pilot 118. When the annular hole cutter has the configuration shown in FIGS. 15 through 17 and is used with steel, in order to prevent chipping or breaking of the outer ends of the cutting edges 108, 110 these outer ends have flats 124, 126 ground thereon so that the front rake angle at these outer end portions of the cutting edges are substantially less than the rake angle of the remaining portions of the cutting edges.

Figure 18:
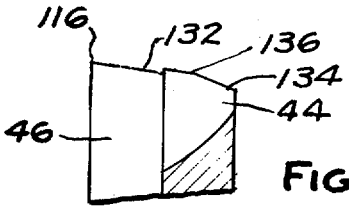
FIG. 18 is a fragmentary sectional view of another form of cutter according to this invention.

In shaping the cutter teeth so that the high point 116 of each tooth is at the outer periphery of the cutter, it is not essential that the back off face is sloped continuously as a straight line in an axially upwardly and radially inwardly direction as shown at 114 in FIGS. 16 and 17. For example, as shown in FIG. 18, the high point 116 of each tooth can be located at the outer periphery of the cutter and the back off faces 132, 134 can be inclined relative to one another so as to intersect as at 136. In this construction the inner gullet 44 and the outer gullet 46 would have substantially the same configuration as illustrated in the embodiments shown in FIGS. 1 through 5.

Figure 19:
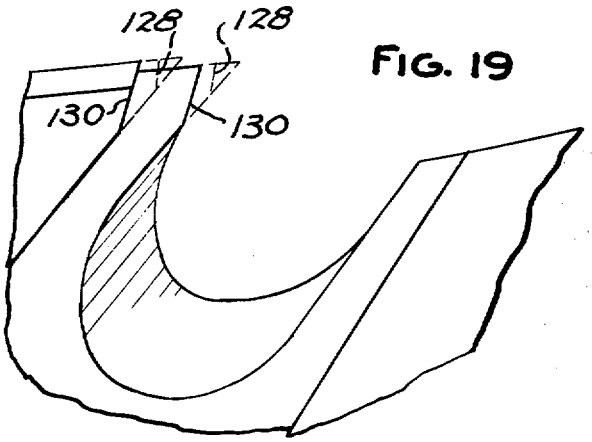
FIG. 19 is an enlarged fragmentary perspective view of the cutter illustrating the manner in which the teeth can be sharpened or resharpened.

In FIG. 19 there is illustrated in a somewhat diagrammatic way another feature of the annular cutter of this invention which is highly desirable. As pointed out previously, the inner and outer gullets (for example, the gullets 44 and 46) are preferably formed at a helix angle of between 35°–45°. The trailing faces of these gullets define the front rake faces of the respective cutting edges. A rake angle in excess of 35° or 45° is seldom required for cutting most materials. However, a rake angle of substantially less than 35° or 45° is frequently required for cutting many materials. Thus, with the present cutter if the gullets are formed at a helix angle of between 35°–45° the trailing faces thereof adjacent the cutting edges can be ground to a lesser rake angle without in any manner interfering with the gullet configuration. For example, as shown in FIG. 18, if it is desired to produce a cutter with a rake angle of less than 35° or 45° it is merely necessary to grind a small flat on the trailing face of the gullets adjacent and across the full width of the cutting edges. In the arrangement shown in FIG. 18 gullets are originally formed with an inclination of about 45° to the cutter axis. If it is desired to provide the cutter with a front rake angle of only 10°, each of the gullets can be ground along the plane designated by the broken line 128; if it is desired to provide a front rake angle of about 20°, the trailing faces of the gullets can be ground adjacent the cutting edges in the plane designated by the line 130. Thus, the relatively high helix angle of the gullets provide a maximum lift to the chips being cut and, at the same time, enable the cutters after being initially formed in the manner illustrated in FIG. 6 through FIG. 9 to be sharpened or resharpened to any desired front rake angle. Thus, large quantities of cutter blanks can be processed through the steps shown in FIGS. 6 through 9 and thereafter selected ones of the cutters can be subjected to a single further operation to provide the front rake angle desired in the light of the material on which the cutter is to be used.

It will be appreciated that if the gullets were initially formed so that they incline to the axis of the cutter at an angle substantially less than 35°–45°, then sharpening of the cutting edges to the desired rake angles could result in the formation of an inwardly offset step or shoulder in the trailing faces of the gullets which would impede the free flow of chips away from the cutting edges.

Figure 20:
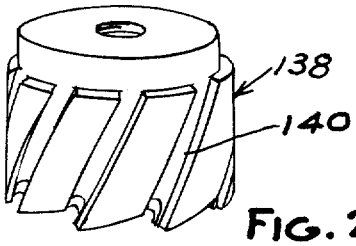
FIG. 20 is a perspective view of another form of cutter according to the present invention.

As pointed out previously, the cutter designated 138 in FIG. 20 has the same tooth configuration as the cutter illustrated in FIGS. 1 through 5. However, in cutter 138 the outer gullets 140 terminate at their upper ends at approximately the level of the lower face of the top wall of the cutter.

As mentioned previously, the cutter of this invention is designed to be employed with either a hand-held power tool or a rigid machine tool. In either event, when the cut is initiated the crests of the teeth initially cut a shallow groove in the workpiece. This is true regardless of whether the crests of the teeth are located at the outer periphery of the cutter as illustrated in FIGS. 16 and 18 or whether the crests are located along a line intermediate the inner and outer periphery of the cutter side wall. However, after the tool has penetrated into the workpiece a relatively small extent (for example, 0.002–0.005 inch) the high point of the inner cutting edge engages the workpiece and substantially widens the groove cut initially by the high point of the outer cutting edge. Thereafter, both cutting edges of each tooth penetrate into the workpiece so as to establish a groove which corresponds in width with the thickness of the side wall of the cutter. Thus, after the cut is initiated all of the cutting edges take the same depth of cut so that the wear on all of the cutting edges is substantially uniform.

Where the cutting edges are staggered circumferentially and spaced apart vertically it is desirable to locate the outer cutting edge behind the inner cutting edge and to locate the high point on the tooth on the outer cutting edge. This construction is preferred so that the chip cut by the outer cutting edge will trail the chip cut by the inner cutting edge and will be generally confined in the portion of the outer gullet which is offset circumferentially from the inner gullet. In addition, the high point of the cutting edge (the point that engages the workpiece first) is normally more vulnerable to chipping and breaking than are the remaining portions of the cutting edges. When this high point is located in the rearwardly offset cutting edge it is backed up by the mass of the entire tooth which imparts rigidity to this high point and which provides a large mass of material immediately adjacent the high point to dissipate heat.

It is also desirable to locate the high point on the outer cutting edge so as to produce a clean hole without a burr by eliminating the tendency for the metal below the outer cutting edge to bend as the high point of the cutting edge breaks through the lower surface of the workpiece.

In most instances the inner and outer cutting edges will be staggered a sufficient distance and the shoulder connecting these two cutting edges will be so designed as to produce either a single chip which readily fractures along its center line or at least two separate chips. It is clear that with the cutter construction disclosed herein two chips can escape more readily and freely through the outer gullet than can a single wide chip. In addition, a narrow chip can be broken more easily after it escapes out of the gullet than can a wide chip.

I claim:

[1. An annular hole cutter comprising a generally circular cylindrical side wall having a plurality of cutting teeth spaced around one end thereof and having means at the other end for mounting the cutter on a rotary driving member, each tooth having at least two generally radially extending cutting edges adapted to cut a circular groove when the cutter is rotated and fed axially into a workpiece, one of said cutting edges extending outwardly from the inner periphery of the cutter and another extending inwardly from the outer periphery of the cutter, all of said inner cutting edges being disposed at substantially the same height so as to penetrate into the material being cut to substantially the same depth and all of said outer cutting edges being disposed at substantially the same height so as to penetrate into the material being cut to substantially the same depth when the cutter is rotated and fed axially into a workpiece, whereby the cutting load is the same on all of the inner teeth and the cutting load is the same on all of the outer teeth, the inner cutting edge of each tooth being staggered circumferentially forwardly in the direction of rotation of the cutter relative to the outer cutting edge of each tooth.]

2. An annular hole cutter as called for in claim [1] *40* wherein the radially outer end of each inner cutting edge is disposed below the radially adjacent portion of the outer cutting edge and above the lowest portion of the outer cutting edge.

3. An annular hole cutter as called for in claim [1] *40* wherein the radially inner end of the outer cutting edge and the radially outer end of the inner cutting edge are connected by a shoulder portion extending [axially] *circumferentially* of the side wall.

4. An annular hole cutter as called for in claim 2 wherein the lowest portion of the outer cutting edge is disposed radially intermediate the inner and outer ends of the outer cutting edge.

5. An annular hole cutter as called for in claim [1] *34* wherein each of said inner cutting edges is radially inclined to form a positive side rake angle with the inner periphery of the side wall and each of said outer cutting edges is radially inclined to form a positive side rake angle with the outer periphery of the side wall.

6. An annular hole cutter as called for in claim [1] *40* wherein each tooth is formed with a generally radially extending cutting edge intermediate said inner and outer cutting edges, the combined radial extents of the outer and intermediate cutting edges of each tooth being at least as great as the radial extent of the inner cutting edge.

[7. An annular hole cutter as called for in claim 1 wherein the circumferential space between the cutting edges of each tooth and the trailing edge of the next successive forward tooth comprises radially inner and outer gullets, said inner gullet having a radially inner wall which tapers radially outwardly in an upward direction, said inner gullet opening outwardly into said outer gullet, said outer gullet extending from said outer cutting edge upwardly beyond said inner gullet and beyond said teeth and being inclined rearwardly relative to the direction of rotation of the cutter with respect to the vertical axis of the cutter.]

[8. An annular hole cutter as called for in claim 7 wherein said outer gullet extends radially inwardly from the outer surface of said wall to at least the circle defined by the outer end of said inner cutting edge, said outer gullet extending circumferentially rearwardly relative to the direction of rotation beyond the outer end of said inner cutting edge.]

9. An annular hole cutter as called for in claim [7] *40* wherein said outer gullet is inclined rearwardly relative to the axis of the cutter at an angle of about 20° to 45°.

10. An annular hole cutter as called for in claim 9 wherein the front rake face of each cutting edge is inclined rearwardly relative to the axis of the cutter at a lesser angle than the inclination of said gullets.

[11. An annular hole cutter as called for in claim 8 wherein each of the inner cutting edges has a radial extent not greater than the radial extent of the outer cutting edges so that the chip cut by the inner cutting edge will have a width not greater than the radial extent of said outer gullet.]

12. An annular hole cutter as called for in claim [7] *40* wherein the front rake face of each inner cutting edge is disposed radially to form a positive side rake angle with the inner periphery of the cutter and the front rake face of the outer cutting edge is disposed to form a positive side rake angle with the outer periphery of the cutter.

13. An annular hole cutter as called for in claim [7] *40* wherein said outer gullet increases in radial extent in an upward direction.

[14. An annular hole cutter as called for in claim 7 wherein the radial extent of the outer gullet is as large as the radial extent of the inner gullet.]

15. An annular hole cutter as called for in claim [7] *40* wherein the circumferential extent of the outer gullet is greater than the circumferential extent of the inner gullet.

16. An annular hole cutter as called for in claim [7] *40* wherein the leading face of the outer gullet is spaced forwardly of the leading face of the inner gullet and the trailing face of the outer gullet is spaced rearwardly of the trailing face of the inner gullet.

17. An annular hole cutter as called for in claim [7] *40* wherein the circumferential extent of the outer gullet is about one and one-half times the thickness of said side wall.

18. An annular hole cutter as called for in claim [7] *40* wherein each of said gullets has a trailing face, the trailing face of the outer gullet terminating at its lower end adjacent said outer cutting edge and the trailing face of the inner gullet terminating at its lower end adjacent said inner cutting edge.

19. An annular hole cutter as called for in claim [7] *40 wherein said inner and outer gullets are inclined rearwardly in an upward direction relative to the axis of the cutter and* the front rake angle of at least one of said cutting edges is less than the angular inclination of its respective gullet.

20. An annular hole cutter as called for in claim [7] *40* wherein at least the radially inner portions of said inner cutting edges are inclined axially upwardly in a radially inward direction and at least the radially outer portions of said outer cutting edges are inclined axially upwardly in a radially outward direction.

21. An annular hole cutter as called for in claim 20 wherein the oppositely inclined cutting edge portions on each tooth intersect to define a crest on each tooth which is disposed radially intermediate the inner and outer peripheries of the side wall.

22. An annular hole cutter as called for in claim [7] *40* wherein the bottom face of each tooth is defined by a back off face comprising a surface sloping axially upwardly in a radially inward direction across the full width of the tooth.

23. An annular hole cutter as called for in claim [7] *40* wherein the bottom face of each tooth is defined by a back off face comprising two radially contiguous surfaces, the radially inner surface sloping axially upwardly in a radially inward direction and the radially outer surface sloping axially upwardly in a radially outward direction.

24. An annular hole cutter as called for in claim 23 wherein said two surfaces of said back off face intersect to form a crest radially intermediate the inner and outer peripheries of the side wall.

25. An annular hole cutter as called for in claim 24 wherein said crest on each tooth intersects the outer cutting edge of the tooth.

26. An annular hole cutter as called for in claim 25 wherein the radially outer end of each inner cutting edge is disposed in a plane not more than about 0.010 inch above said crest.

27. An annular hole cutter as called for in claim 26 wherein the radially outer end of each outer cutting edge is disposed in a plane above the radially outer end of the inner cutting edge.

28. An annular hole cutter as called for in claim 24 wherein the front rake angle of each tooth at said crest is less than the front rake angle of said cutting edges at portions thereof spaced radially from said crest.

29. An annular hole cutter as called for in claim [7] *40* wherein said cutter is of generally inverted cup shape and has a top wall, said outer gullets extending upwardly to at least the level of the bottom of said top wall.

30. An annular hole cutter as called for in claim [7] *40* wherein said outer gullets extend the full height of said side wall and open axially upward at the upper end thereof.

31. An annular hole cutter as called for in claim [7] *40* wherein the circumferential dimension of each outer gullet at a level above said teeth is at least as large as the combined radial extents of the cutting edges of each tooth.

32. An annular hole cutter as called for in claim [7] *40* wherein the circumferential extent of each outer gullet at a level above said teeth is greater than the combined radial extents of the cutting edges of each tooth.

33. An annular hole cutter as called for in claim [7] *40* wherein the inner and outer cutting edges of each tooth are connected by a curved cutting edge portion.

34. An annular hole cutter as called for in claim [7] *40* wherein each outer gullet is provided with generally radially extending leading and trailing faces which are generally parallel.

35. An annular hole cutter as called for in claim [7] *40* wherein the inner and outer cutting edges are staggered circumferentially at least about 0.025 inch.

[36. An annular hole cutter comprising a generally circular cylindrical side wall having a plurality of cutting teeth spaced around one end thereof and having means at the other end for mounting the cutter on a rotary driving member, each tooth having a generally radially extending cutting edge at its lower end defined by a front rake face and a bottom back off face, each of said cutting edges having a radially inner portion and a radially outer portion, said two cutting edge portions being circumferentially staggered and when viewed in plan being inclined radially to each other such that the front rake face adjacent the inner cutting edge portion forms a positive side rake angle with the inner periphery of the side wall and the front rake face adjacent the outer cutting edge portion forms a positive side rake angle with the outer periphery of the side wall.]

[37. An annular hole cutter as called for in claim 36 wherein the outer cutting edge portion is staggered circumferentially rearwardly of the inner cutting edge potion.]

[38. An annular hole cutter as called for in claim 37 including a shoulder extending circumferentially between the radially inner end of the outer cutting edge portion and the radially outer end of the inner cutting edge portion.]

39. An annular hole cutter as called for in claim [7] *40* wherein the height of the day light area of the inner gullet is not greater than about 0.040 inch.

*40. An annular hole cutter comprising:*

*(a) a generally circular cylindrical side wall having a plurality of cutting teeth spaced around the lower end thereof and having means at the upper end for mounting the cutter on a rotary driving member;*

(*b*) *each tooth having an inner cutting edge extending generally radially outwardly from the inner periphery of said side wall and an outer cutting edge extending radially inwardly from the outer periphery of said side wall;*

(*c*) *all of said inner cutting edges being disposed at substantially the same height so as to penetrate into the material being cut to substantially the same depth and all of said outer cutting edges being disposed at substantially the same height so as to penetrate into the material being cut to substantially the same depth when the cutter is rotated and fed axially into the workpiece, whereby the cutting load is substantially the same on all of the inner cutting edges and the cutting load is substantially the same on all of the outer cutting edges;*

(*d*) *the inner cutting edge of each tooth being staggered circumferentially forwardly in the direction of rotation of the cutter at its radially outer end relative to the radially inner end of the outer cutting edge on each tooth and being spaced substantially closer to the outer cutting edge of its respective tooth than to the outer cutting edge of the next successive tooth;*

(*e*) *the circumferential space between the cutting edges of successive teeth comprising radially inner and outer gullets, said inner gullet extending upwardly from said inner cutting edge and having a radially inner wall which tapers radially outwardly in an upward direction, said outer gullet extending upwardly from said outer cutting edge and radially inwardly from the outer periphery of said side wall, said inner gullet opening outwardly into said outer gullet, said outer gullet having a radially inner wall spaced radially outwardly from the inner wall of said inner gullet and extending upwardly substantially beyond said inner gullet and beyond said teeth;*

(*f*) *the trailing face of the outer gullet being staggered circumferentially rearwardly from the trailing face of the inner gullet;*

(*g*) *said outer gullet having a radial dimension and a circumferential dimension at least as large as the effective length of the inner cutting edge so as to accommodate the flow of chips cut by the inner cutting edge and directed into the outer gullet by the radially inner wall of the inner gullet and thereby discharge the chips cut by both the inner and outer cutting edges upwardly through the passengeway defined by the outer gullet and the outer periphery of the groove cut by said teeth.*

*41. An annular hole cutter as called for in claim 40 wherein each inner cutting edge inclines axially upwardly in a radially inward direction.*

*42. An annular hole cutter as called for in claim 40 wherein said outer gullets are inclined rearwardly in an upward direction relative to the direction of rotation of the cutter.*

*43. An annular hole cutter as called for in claim 40 wherein each outer gullet extends circumferentially radially (in relation to the direction of rotation of the cutter) beyond the outer end of the adjacent inner cutting edge.*

References Cited

The following references, cited by the Examiner, are of record in the patented file of this patent or the original patent.

UNITED STATES PATENTS

| | | | |
|---|---|---|---|
| 53,722 | 4/1866 | Wyckoff | 408—204 |
| 2,662,428 | 12/1953 | Mueller | 408—216 X |
| 3,609,056 | 9/1971 | Hougen | 408—204 |

GIL WEIDENFELD, Primary Examiner

U.S. Cl. X.R.

408—223, 230; 29—105 A